United States Patent [19]

Clayton

[11] 4,329,724
[45] May 11, 1982

[54] TAPE TRANSDUCER CARRIER WITH DIHEDRAL AND PROTRUSION ADJUSTMENT

[75] Inventor: Richard W. Clayton, Medford, N.J.

[73] Assignee: RCA Corporation, New York, N.Y.

[21] Appl. No.: 138,735

[22] Filed: Apr. 9, 1980

[51] Int. Cl.³ .......................................... G11B 21/24
[52] U.S. Cl. ................................................. 360/109
[58] Field of Search ...................... 360/104, 105, 109; 403/4

[56] References Cited

U.S. PATENT DOCUMENTS

| | | | |
|---|---|---|---|
| 3,286,041 | 11/1966 | Nishiwaki | 360/109 |
| 4,081,848 | 3/1978 | Blanding | 360/109 |
| 4,117,522 | 9/1978 | Whittle et al. | 360/109 |

FOREIGN PATENT DOCUMENTS 37-12441  6/1962  Japan ................................. 360/109

*Primary Examiner*—Aristotelis M. Psitos
*Attorney, Agent, or Firm*—Eugene M. Whitacre; Paul J. Rasmussen; William H. Meise

[57] ABSTRACT

A transducer mounting arrangement for tape record and/or replay systems having a rotating scanner is provided wherein both transducer protrusion from the cylindrical surface of the scanner and the dihedral angle between the planes in which the gaps of the transducers reside, are adjustable.

2 Claims, 3 Drawing Figures

TAPE TRANSDUCER CARRIER WITH DIHEDRAL AND PROTRUSION ADJUSTMENT

BACKGROUND OF THE INVENTION

In tape record and/or replay systems of the type wherein tracks are scanned at an angle to the direction of tape travel, the erase, record and/or replay transducers are disposed on a rotating scanner. Depending on the particular system, the transducers are arranged about the cylindrical surface of the scanner and protrude from that surface to scan the tape tracks. These transducers deteriorate due to the wear and in the more modern record and/or replay systems, the individual transducers or groups of transducers are replaceable. The gaps of transducers separated about the cylindrical surface of the scanner reside in planes which are separated by dihedral angles and for best results, such angles should be adjusted when transducers are replaced. Furthermore, the transducer protrusion from the cylindrical surface of the scanner should also be adjusted in magnitude to equal the protrusion of the other transducers, when transducers are replaced. Mounting arrangements are known with which either the transducer protrusion or the dihedral angle can be adjusted but not both. It has not yet been possible to incorporate these adjustments together in a mounting arrangement because the transducer must be positioned along an axis for the protrusion adjustment, whereas the transducer must be angularly positioned about a pivot point along that axis for the dihedral angle adjustment.

SUMMARY OF THE INVENTION

A transducer mounting arrangement is provided with which both the protrusion and dihedral angle adjustments can be made. In one preferred embodiment, the angular positioning about a pivot point along the protrusion axis is made possible with a keyhole slot having major and minor arcuate portions from centers aligned along the protrusion axis. Tapered head screws are then disposed through this keyhole slot to separately engage these arcuate portions in providing the protrusion adjustment, while the pivot point for the dihedral angle adjustment is provided at the interface between the minor arcuate portion and its screw.

DESCRIPTION OF THE PREFERRED EMBODIMENTS

Figure 1:
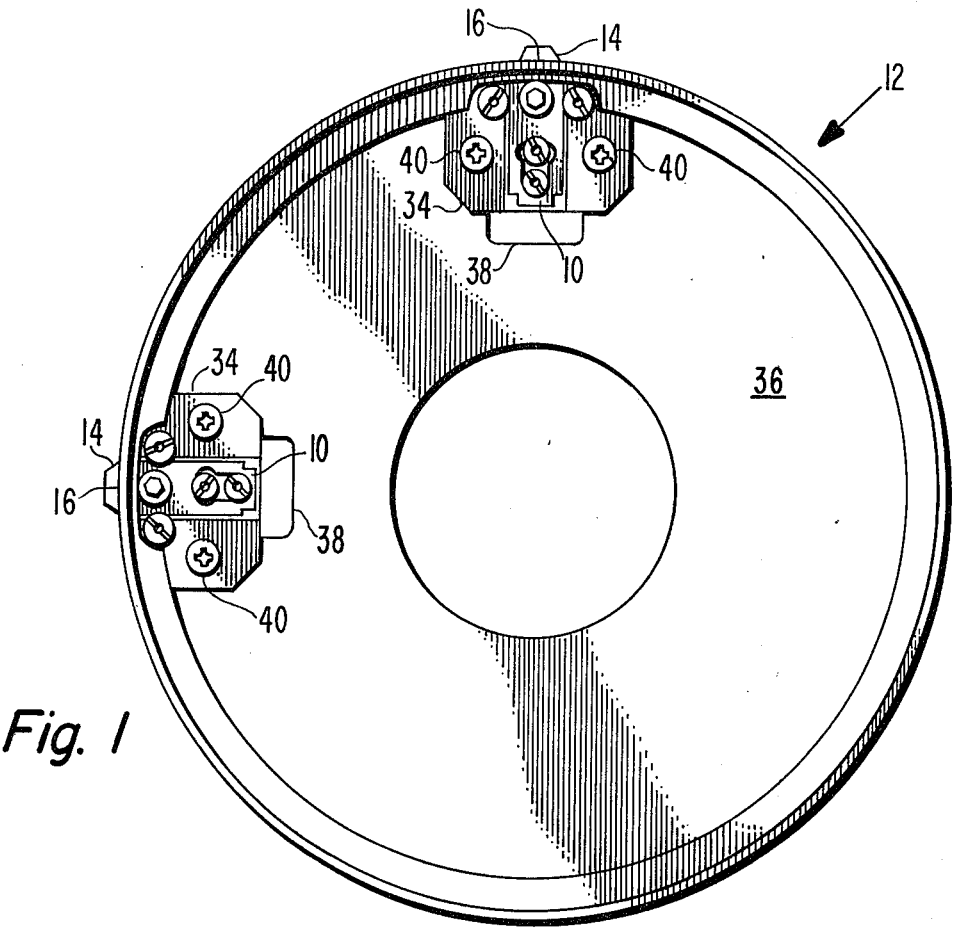
FIG. 1 illustrates one preferred embodiment of the invention as it would be incorporated on a scanner in a particular record and/or replay system.

Transducers 10 are shown mounted at two locations on a scanner 12 from a tape record and/or replay system in FIG. 1. For illustrative purposes only, the transducer locations are separated by 90° in FIG. 1 but could be separated by any angle that may be required in systems such as quadruplex or helical scan types. The scanner 12 rotates to scan tracks at an angle to the direction of tape travel in the record and/or replay system. Each transducer 10 protrudes from the cylindrical surface of the scanner 12 and includes a gap 16. To attain the best performance during either the record or replay modes, the transducers 10 should protrude by equal distances and the planes in which the gaps 16 reside should be separated precisely by a predetermined dihedral angle which is the same 90° as discussed previously. Therefore, it is desirable for these parameters to be adjustable, especially when the transducers 10 are replaceable.

Figure 2:
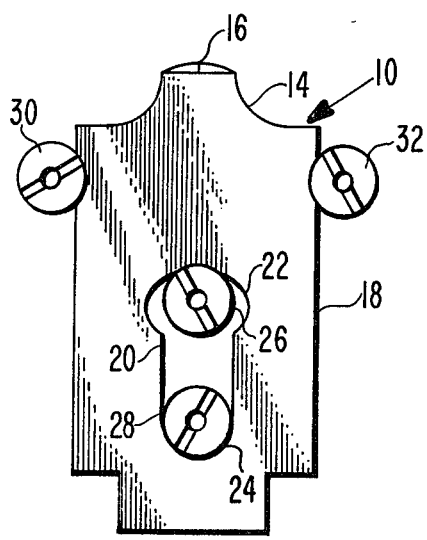
FIG. 2 is an expanded view of the transducer mounting arrangement utilized in FIG. 1.

In FIG. 1, each transducer 10 is retained on the scanner 12 by the mounting arrangement of this invention which includes means for making adjustments to both the transducer protrusion from the cylindrical surface of the scanner 12 and the dihedral angle between the planes in which the gaps 16 reside. One preferred embodiment of this adjustment means is shown in FIG. 1 and also in FIG. 2 which is an expanded view for greater clarity. Each transducer 10 is constructed on a carrier 18 using a core having two pole pieces between which the gap 16 is disposed and having turns of wire disposed thereon to control or monitor the magnetic field flowing therein. A keyhole slot 20 having a major arcuate portion 22 and a minor arcuate portion 24 from centers aligned along the transducer protrusion axis, is disposed through the carrier 18. Tapered head screws 26 and 28 are disposed through the keyhole slot 20 to retain the carrier 18 by separately engaging the arcuate portions 22 and 24 at opposite ends of the protrusion axis. The carrier 18 is further retained by tapered head screws 30 and 32 which are disposed externally thereto and at opposite sides thereof along the protrusion axis.

When positioning the transducer 10 along its protrusion axis, one of the screws 26 or 28 is first loosened and then the other screw 26 or 28 is tightened. As an example, if the protrusion from the cylindrical surface of the scanner 12 were to be increased, screw 28 would first be loosened and then screw 26 would be tightened. When adjusting the dihedral angle between the planes in which the gaps 16 reside, one of the screws 30 or 32 is first loosened and then the other screw 30 or 32 is tightened. As an example, if the dihedral angle is to be changed by tilting the protrusion axis counter-clockwise, screw 30 is first loosened and then screw 32 is tightened to change the orientation of the protrusion axis about a pivot point substantially disposed at the interface between the arcuate portion 24 and the screw 28.

Figure 3:
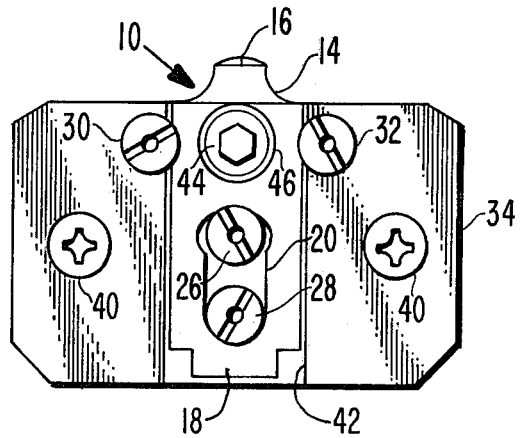
FIG. 3 is an expanded view of the transducer module utilized in FIG. 1, which generally incorporates the transducer mounting arrangement of FIG. 2.

To facilitate replacement of the transducers 10 in FIG. 1, the transducer mounting arrangement of the invention is modularized by retaining each transducer 10 in a module base 34, as shown with greater clarity in FIG. 3. The module base 34 is retained to a web portion 36 of the scanner 12 within a window 38 by screws 40. The carrier 18 with the transducer 10 is slidably disposed in a slot 42 on the module base 34 and is retained thereto by a hold-down screw 44 which is threaded into the module base 34 through a washer 46 and a clearance hole (not shown) in the carrier 18. The orientation of the gap 16 in the transducer 10 is adjustable within the module base 34 and consequently adjustable on the scanner 12, using the screws 26 and 28 through the keyhole slot 20 and screws 30 and 32 in the same manner as described previously in regard to FIG. 2. In this embodiment, the screws 26, 28, 30 and 32 merely position the transducer 10 in the module base 34 and hold-down screw 44 retains the transducer 10 therein.

What I claim is:

1. In a tape record and/or replay system of the type wherein at least two transducers are disposed about the cylindrical surface of a scanner which rotates to scan tracks at an angle to the direction of tape travel, the improvement comprising:

a transducer mounting arrangement including means for making adjustment to both the transducer protrusion from the cylindrical surface of the scanner and the dihedral angle between the planes in which the gaps reside, said (the) transducer mounting arrangement (of claim 1 wherein) including a carrier (is included) with a keyhole slot therethrough having major and minor arcuate portions from centers aligned along the transducer protrusion axis, and further including first and second tapered-head screws (are) disposed through said keyhold slot to retain said carrier by separately engaging said major and minor arcuate portions respectively at interfaces at opposite ends of (the) said protrusion axis, said carrier being positionable along (the) said protrusion axis by first loosening (one) said first of said screws and tightening the (other) second of said screws, said interface between said minor arcuate portion and said second screw being substantially a pivot point about which the dihedral angle adjustment is made.

2. The transducer mounting arrangement of claim 1 wherein said carrier is further retained by third and fourth tapered-head screws disposed externally to said carrier and at opposite sides thereof along the protrusion axis which is tilted substantially about said pivot point to adjust the dihedral angle by first loosening one of said third or fourth screws and then tightening the other of said third or fourth screws.

* * * * *